United States Patent Office 2,791,605
Patented May 7, 1957

2,791,605
STABILIZATION OF SALTS OF MONOALKYLDI-
THIOCARBAMIC ACIDS

Stephen C. Dorman and August B. Lindquist, Jr., Mountain View, Calif., assignors to Stauffer Chemical Company, a corporation of Delaware No Drawing. Application June 22, 1955,
Serial No. 517,366

3 Claims. (Cl. 260—500)

It has heretofore been found that compounds having formula:

wherein R is a methyl or ethyl radical and M is an alkali metal, an alkaline earth metal or an ammonium radical, are effective soil sterilizers and exert an intense but short lived phytocidal and biocidal action whereby substantially all plant and animal life in the soil is killed, yet such compounds readily decompose in the soil so that a few days later a crop can be successfully planted in the soil.

Although such compounds are highly effective in contrast with closely analogous compounds, the nature of the compounds is such that they rapidly decompose and develop a strong odor when stored as solids or as aqueous solutions in the normal concentrations which might be used for application to the soil.

The development of odor is not fully understood but at least part of the odor apparently comes about through the decomposition of the substance to methyl isothiocyanate and only slight decomposition is necessary in order to give rise to this undesirable odor. However, other odors develop as well which are irritating and lachrymatory. Contact with metals accelerates the formation of odors.

It has been found that the compounds described above can be largely stabilized against decomposition by maintaining them in highly concentrated solutions. It is preferred to maintain the compound in about a 30% aqueous solution although solutions of from 20% to 40% are usuable. It has further been found that the bad odor can be prevented by adding a small amount of an amine to the aqueous solution.

Sodium-N-methyl dithiocarbamate is a solid but in a solid condition may decompose. The following tests were made with this compound to demonstrate the stability achieved through the use of concentrated aqueous solutions. The solutions were made up in various concentrations and stored at an elevated temperature of 60° C. for one week. The following data were obtained.

| Concentration of Compound in Aqueous Solution | Percent Compound Decomposed after 1 week at 60° C. |
|---|---|
| 40% | 4.2 |
| 20% | 8.9 |
| 10% | 18.3 |
| 2.5% | 68.5 |

Further, when the 40% solution was stored under normal room temperature conditions, no appreciable decomposition occurred during the period of several months, although an odor developed after one month.

Although decomposition can largely be prevented by means of the strong aqueous solutions, as set forth above, only a slight decomposition is necessary to produce a highly undesirable odor. It has been found that the compounds can be even further stabilized as far as odor development is concerned by combining the compound with an amine. Although the invention is not predicated on the theory of its operation, it is believed that at least part of the odor stabilization results from the fact that the dithiocarbamate decomposes to form an isothiocyanate and that the isothiocyanate reacts with amine to produce a thiourea which is odor-free.

The amines are employed in quantities of from 0.1% to 1%, by weight, based on the total composition. Although any amine can be used, it is preferred to employ those amines which are soluble to the extent of 0.1% to 1.0% in water. Thus, it is preferred to use aliphatic primary amines having from 1 to 6 carbon atoms such as methyl, ethyl, propyl, butyl, amyl and hexyl amines, aliphatic secondary amines having from 1 to 4 carbon atoms in each aliphatic group such as dimethyl, diethyl, diisopropyl, dibutyl amines, diamines having the formula $NH_2(CH_2)_nNH_2$ where $n$ is 2 to 6 and aromatic amines having at least a slight water solubility such as aniline and the aminophenols. Other amino compounds such as mono and diethanol amines, 2-methyl amino propanol and salts of amino acids having free primary or secondary amino groups can also be used. Since the amine reacts with the isothiocyanate to form a thiourea, it is further preferred to use an amine which forms a water soluble thiourea such as methyl amine, ethyl amine or ammonia. In this manner, the product will remain clear even if a small percentage has decomposed. Although it is generally preferred to use less than 1% of the amine, greater quantities will do no harm. As an example, when a solution was made up consisting of 30% sodium-N-methyl dithiocarbamate, 0.2 methyl amine and the balance water, no odor could be detected after six months' storage. Similar results were obtained using as little as 0.1% of the amine.

This application is a continuation-in-part of our application Serial No. 446,406 filed July 28, 1954.

We claim:

1. The method of stabilizing a compound of the formula:

wherein R is chosen from the group consisting of methyl and ethyl radicals and M is chosen from the group consisting of alkali metals, alkaline earth metals and the ammonium radical, comprising maintaining said compound in an aqueous solution wherein said compound is in a concentration of from 20% to 40%.

2. The method of claim 1 wherein a small amount of an amine selected from the group consisting of primary and secondary amines is present in a concentration of at least 0.1%.

3. The method of claim 2 wherein the amine is dissolved and is in a concentration of from 0.1 to 1%.

References Cited in the file of this patent

UNITED STATES PATENTS

| 1,983,240 | Olin | Dec. 4, 1934 |
| 2,185,247 | Cunningham et al. | Jan. 2, 1940 |
| 2,203,374 | Van Nelson et al. | June 4, 1940 |
| 2,563,007 | Crouch | Aug. 7, 1951 |
| 2,665,285 | Johnson | Jan. 5, 1954 |